March 28, 1933.  E. C. HEAD  1,903,043
METHOD OF CUTTING GEARS
Original Filed Nov. 28, 1928
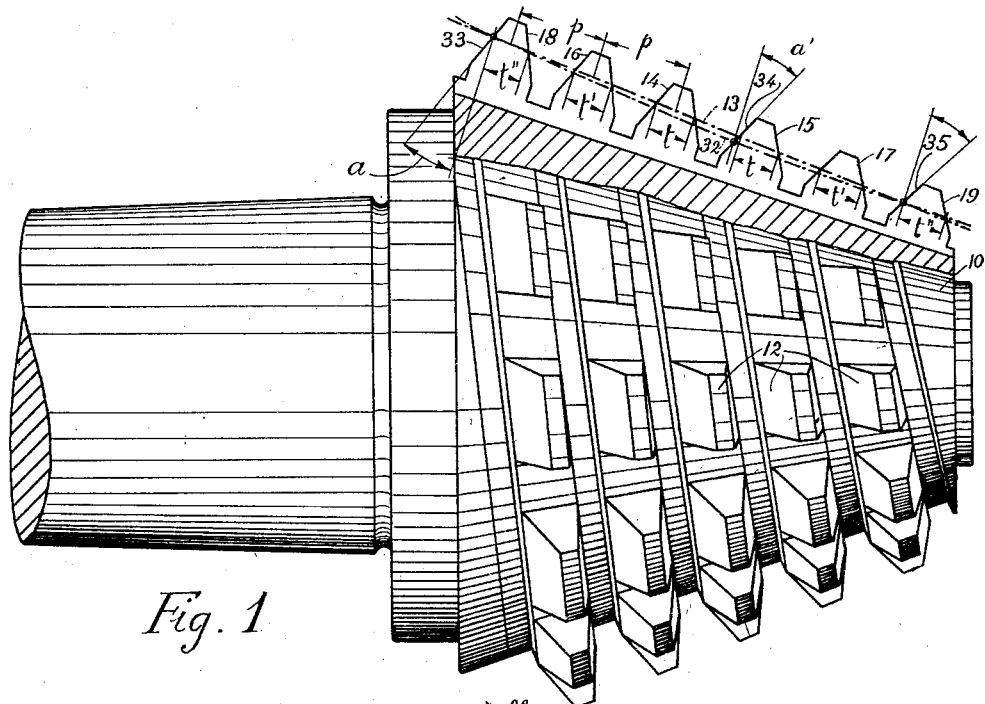
Fig. 1
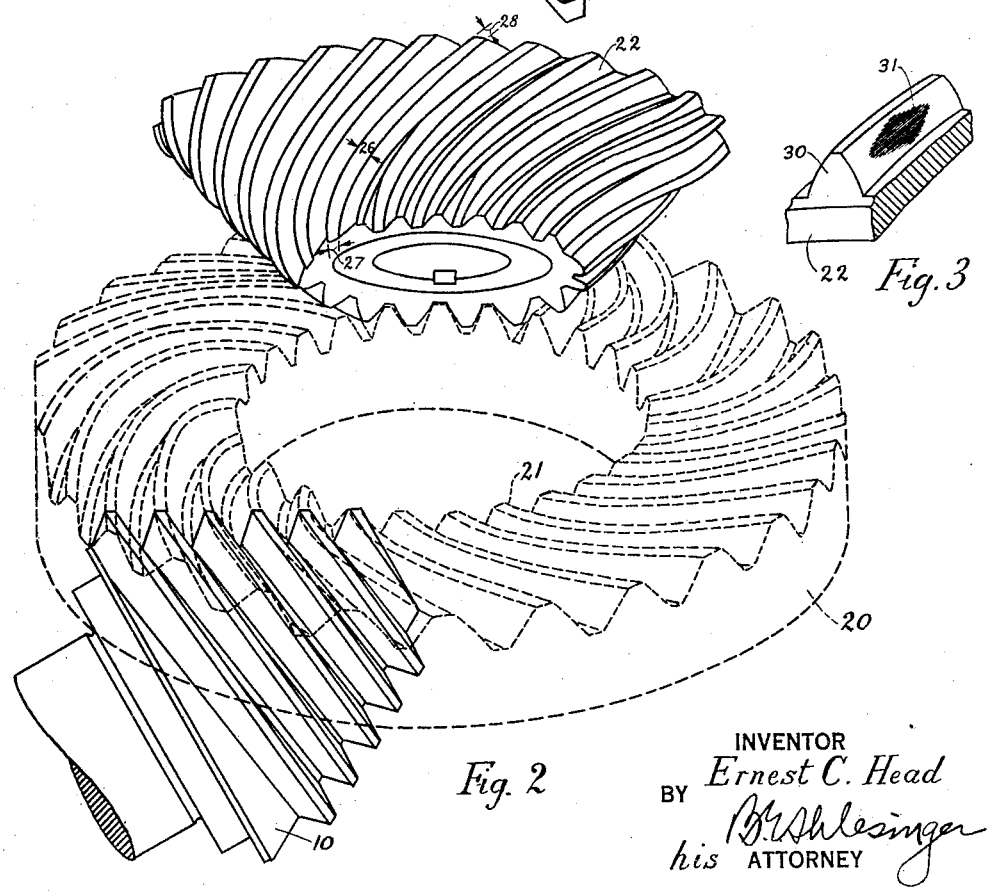
Fig. 2
Fig. 3
INVENTOR
Ernest C. Head
BY
his ATTORNEY Patented Mar. 28, 1933

1,903,043

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

METHOD OF CUTTING GEARS

Original application filed November 28, 1928, Serial No. 322,498. Divided and this application filed July 16, 1930. Serial No. 468,353.

The present invention relates to a method of cutting longitudinally curved tooth tapered gears, such as spiral bevel and hypoid gears, and particularly to a method of hobbing such gears.

The present application is a division of my pending application Serial No. 322,498, filed November 28, 1928, which covers the hob that is employed in the present method as a cutting tool. The preferred method of relieving this hob and a preferred embodiment of an apparatus for effecting the relieving operation are described in my pending application, Serial No. 456,215, filed May 27, 1930, which is, also, a division of my application, Serial No. 322,498.

Longitudinally curved tooth tapered gears as hobbed by previous hobbing methods have lacked adjustment in mesh because by previous methods of hobbing, the two members of a pair were provided with tooth surfaces which matched each other along their whole length with the consequence that the gears had a full length bearing or tooth surface contact when in mesh. Such gears had, therefore, to be very accurately and very rigidly mounted. In their lack of adjustment, these gears hobbed by previous hobbing methods have compared unfavorably with longitudinally curved tooth tapered gears cut according to other than hobbing methods, because in cutting mating gears by other cutting methods, such as, for instance, methods employing a face mill, it is possible to cut the gears so that the mating tooth surfaces will match each other along a portion of the tooth length only, with the consequence that the tooth bearing or contact can be localized or concentrated at any point along the length of the tooth surface.

The purpose of the present invention is to provide a method which will permit of producing, in the process of hobbing a tapered gear, tooth surfaces on the gear which will match the contacting tooth surfaces of a mating gear along a portion of their length only. Thus, it is possible with the present invention to hob tapered gears which can be more readily assembled and which are more dependable under the conditions met with in actual use than tapered gears hobbed according to any previously known process.

The purpose of the present invention is accomplished by hobbing the gears with a hob whose teeth vary in thickness at different points along the length of the hob from the thickness of correspondingly located teeth of a standard hob of corresponding pitch or lead. In the hobbing process, this hob is positioned so that it extends diagonally across the face of the gear blank to be cut. Thus, when the hob and blank are rotated together, different teeth of the hob will cut at different points along the length of the tooth spaces of the gear blank. Thus the tooth spaces cut in the blank which will vary in width along their length from standard width. So, if the hob is constructed to produce according to the present invention teeth in the gear which are of normal thickness midway their length and of gradually decreasing width toward both ends, the tooth surfaces of this gear will contact or bear on the tooth surfaces of a mating gear, cut according to the process of this invention or according to standard practice, in the middle portion of their length only. Hence, the two gears will have a localized tooth bearing or contact and will, therefore, readily accommodate themselves to the unavoidable inaccuracies of mounting and to the displacements due to variation in loads which occur in commercial installations.

In the drawing:

Figure 1 is an elevational view, partly in section, of one form of hob which may be employed in cutting gears according to the process of this invention;

Figure 2 is a diagrammatic view illustrating the hobbing process of this invention; and Figure 3 is a view showing the tooth of a spiral bevel gear hobbed by the process of this invention and showing the type of tooth bearing which is obtained when this gear is run with its mate.

10 designates one form of hob which may be employed in cutting gears according to the present invention. This hob is a taper hob which, as usual, has its cutting teeth 11 arranged in a continuous thread. This hob differs from previous forms of hobs in that the teeth of the hob vary in thickness from standard or normal thickness along a pitch line element 13 of the hob or along an element of any conical surface coaxial with the hob. Thus, the teeth 14 and 15 midway the length of the hob may be of the same thickness $t$ measured on the pitch line element 13 but the teeth 16 and 17 more remote from the center of the hob will be of greater thickness $t'$ than the teeth 14 and 15 measured on the pitch line element 13 and in like manner, the teeth 18 and 19 at the two ends of the hob will be of greater thickness $t''$ measured on the pitch line element 13 and the teeth 16 and 17.

When this hob 10 is brought into engagement with the gear blank to be cut with its axis extending diagonally across the face of the blank, it will be seen that the thinner teeth 14 and 15 of the hob will be operating at the center of the face of the gear, while the thicker teeth at the ends of the hob will be operating at the ends of the face of the gear. Thus, tooth spaces will be cut in the gear which are narrower at their centers than at their ends and the teeth, cut in the gear will be, accordingly, wider midway their length than at their ends.

Figure 2 illustrates the method of generating a gear according to this invention. For the sake of clearness in illustration, the cutting teeth are not shown, but the hob is shown in the form of a worm, that is, as it would appear before it is gashed and relieved. The hob 10 represents, of course, a basic gear 20 to which the tapered gear 22 is to be generated conjugate.

The basic gear 20 is shown as a true crown gear, but it will be understood that the present process may be employed in generating gears whether the basic gear be a true crown gear, a nominal crown gear, or a conical gear.

Because of the structure of the hob 10, the teeth 21 of this imaginary basic gear 20 must be considered as being of greater thickness measured on the pitch surface of the crown gear at the ends of the teeth 21 than at points intermediate the ends of said teeth.

The relative motions employed in generating the bevel gear 22 are the same as those which have been employed in previous bevel gear hobbing processes. Thus, the hob 10 is rotated on its axis in timed relation with the rotation of the bevel gear blank 22 on its axis and simultaneously a relative rolling motion is produced between the gear blank 22 and the hob 10 about the axis of the basic gear 20, as though the gear blank 22 were rolling on the basic gear 20. Through this relative rolling motion, teeth are generated on the blank 22 which are conjugate to the teeth of the imaginary basic generating gear 20. These teeth 25 of the gear 22 will, consequently, be wider at a point 26 intermediate their length than at points 27 and 28 at the ends of the teeth.

When a gear 22 cut according to the process of this invention, is run with a mating gear cut in a similar manner or according to previous practice, the mating tooth surfaces of the two gears will bear or have contact in the central portion of their length only. Thus, a bearing or tooth surface contact will be obtained of the character shown in Figure 3, where 30 indicates the tooth of a longitudinally curved tooth gear 22 cut according to this invention and 31 designates the bearing or tooth surface contact obtained when this gear 22 runs with a mating gear. The bearing 31 is what is known as a "localized" bearing; it extends for a portion of the length of the tooth 30 only.

The hob 10 shown in the drawing is a hob constructed according to the preferred embodiment of the invention of my application No. 322,498. While the thicknesses of the teeth of this hob vary on the line 13, the teeth of the hob are arranged in a thread of constant pitch measured on the pitch surface 13. Thus, the distances $p$ from the center of one tooth to another measured on the line 13 are equal. A further feature of construction of this hob is that its teeth are of substantially uniform thickness measured on a circular arc such as the arc 32. This construction is obtained by moving the relieving tool along a circular arc as it moves from one end of the hob to the other during the relieving of the teeth of the hob, as described more particularly in application No. 322,498. This hob 10 has, also, teeth whose cutting edges are of changing pressure angle from one end of the hob to the other. Thus, the pressure angle $a$ of the cutting edge 33 is less than the pressure angle $a'$ of the cutting edge 35 and the pressure angles of the cutting edges increase continuously from the large to the small end of the hob. This feature makes the teeth at the small end of the hob 10 stronger and hence, the hob iself is sronger. The purpose of the changing pressure angles is described more particularly in my co-pending application No. 278,208, filed May 16, 1928.

To secure teeth of tapering depth on the gear 22, the top surface of the hob teeth may be formed on a cone of larger cone angle than the pitch cone of the hob, thus to provide teeth on the hob which decrease in height from the large to the small end of the hob.

With the hob 10, therefore, gears will be cut which will not only have a localized bearing, but which will also have teeth of tapering depth and properly proportioned.

While I have described a hob 10 of a particular form, it will be understood that this invention is capable of wide application. It has as its basis, the use of a hob whose teeth vary in thickness from the normal or standard thickness of corresponding teeth of a hob of corresponding pitch or lead, and so the hob may be either cylindrical or tapered, and of either uniform lead or changing lead. Moreover, while I have described my invention in connection with the generating process for producing bevel gears, it will be understood that it is within the contemplation of my invention to produce gears without employing a rolling motion by simply rotating the hob and gear together in continuous intermeshing engagement to produce by these two motions alone the finished tooth surfaces of the gear.

In general, it may be said that while I have described a particular embodiment of my invention, it will be understood that this invention is capable of various further modifications without departing from its scope and that this application is intended to cover any adaptations, uses, or variations of my invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting a tapered gear which comprises positioning a hob, whose teeth are arranged in a thread, the pitch of which conforms to a definite law, but in which some of the teeth measured on a surface of revolution coaxial with the hob vary in thickness from the normal thickness of corresponding teeth of a thread of the selected pitch, so that said hob extends diagonally across the face of the tapered blank from the outer to the inner end of the tooth zone thereof and rotating said hob and blank continuously in intermeshing engagement.

2. The method of cutting a tapered gear which comprises positioning a hob, provided with teeth which are arranged in a continuous thread with the teeth midway the length of the hob, thinner than at the ends of the hob, so that said hob extends diagonally across the face of a tapered gear blank from the outer to the inner end of the tooth zone thereof and rotating the hob and blank continuously in intermeshing engagement.

3. The method of cutting a tapered gear which comprises positioning a tapered hob provided with teeth which are arranged in a continuous thread and in which the teeth midway the length of the hob are thinner than the teeth at the ends of the hob, so that said hob extends diagonally across the face of a tapered gear blank from the outer to the inner end of the tooth zone thereof and rotating the hob and blank continuously in intermeshing engagement.

4. The method of cutting a tapered gear which comprises positioning a hob having its teeth arranged in a continuous thread, said teeth being of varying thickness measured from a point intermediate the length of the hob toward both ends thereof, so that said hob extends diagonally across the face of a tapered gear blank from the outer to the inner end of the tooth zone thereof and rotating the hob and blank continuously in intermeshing engagement.

5. The method of producing a tapered gear which comprises positioning a taper hob, having its teeth arranged in a continuous thread, said teeth being of varying thicknesses measured from a point intermediate the length of the hob toward both ends thereof, so that said hob extends diagonally across the face of a tapered gear blank from the outer to the inner end of the tooth zone thereof and rotating the hob and blank continuously in intermeshing engagement.

6. The method of cutting a tapered gear which comprises positioning a hob having its teeth arranged in a continuous thread of constant pitch, said teeth being of varying thickness measured on a surface of revolution coaxial of the hob, so that said hob extends diagonally across the face of a tapered gear blank from the outer to the inner end of the tooth zone thereof and rotating the hob and blank continuously in intermeshing engagement.

7. The method of cutting a tapered gear which comprises positioning a taper hob, having teeth arranged in a continuous thread of constant pitch, said teeth being of varying thickness measured on a conical surface coaxial with the hob, so that said hob extends diagonally of the face of a tapered gear blank from the outer to the inner end of the tooth zone thereof and rotating the hob and blank continuously in intermeshing engagement.

8. The method of cutting a tapered gear which comprises positioning a taper hob, having teeth which are arranged in a continuous thread of constant pitch and which decrease in height from the large end of the hob to the small end thereof, and which are of varying thickness measured on a conical surface coaxial of the hob, so that said hob extends diagonally across the face of a tapered gear blank from the outer to the inner end of the tooth zone thereof, and rotating the hob and blank continuously in intermeshing engagement.

9. The method of cutting a tapered gear which comprises positioning a taper hob, having teeth which are arranged in a continuous thread of constant pitch, which decrease in height from the large end of the hob to the small end thereof, which vary in thickness from a point midway the length of the hob toward both ends thereof, and which have cutting edges of changing pressure angle from one end of the hob to the other, so that said hob extends diagonally across the face of a tapered gear blank from the outer to the inner end of the tooth zone thereof, and rotating the hob and blank continuously in intermeshing engagement.

10. The method of cutting a tapered gear which comprises positioning a hob, whose teeth are arranged in a continuous thread, in which the teeth midway the length of the hob are thinner than the teeth at the ends of the hob, and which have cutting edges of changing pressure angle measured from one end of the hob to the other, so that said hob extends diagonally across the face of a tapered gear blank from the outer to the inner end of the tooth zone thereof and rotating the hob and blank continuously in intermeshing engagement.

11. The method of cutting a tapered gear which comprises positioning a hob, having teeth which are of constant thickness measured lengthwise of the hob along a circular arc and which are arranged in a continuous thread, so that said hob extends diagonally across the face of a tapered gear blank from the outer to the inner end of the tooth zone thereof and rotating the hob and blank continuously in intermeshing engagement.

12. The method of cutting a tapered gear which comprises positioning a taper hob, having teeth which are of constant thickness measured lengthwise of the hob along a circular arc and which are arranged in a continuous thread, so that said hob extends diagonally across the face of a tapered gear blank from the outer to the inner end of the tooth zone thereof, and rotating the hob and blank continuously in intermeshing engagement.

13. The method of cutting a tapered gear which comprises positioning a taper hob, having teeth arranged in a continuous thread of constant pitch, which are of uniform thickness measured lengthwise of the hob along a circular arc and which are of varying thickness measured on a surface coaxial with the hob, so that said hob extends diagonally across the face of a tapered gear blank from the outer to the inner end of the tooth zone thereof, and rotating the hob and blank continuously in intermeshing engagement.

14. The method of cutting a tapered gear which comprises positioning a taper hob, having teeth arranged in a continuous thread of constant pitch, which are of uniform thickness measured lengthwise of the hob along a circular arc but which are of varying thickness measured on a conical surface coaxial of the hob, so that said hob extends diagonally of the face of a tapered gear blank from the outer to the inner end of the tooth zone thereof, and rotating the hob and blank continuously in intermeshing engagement.

15. The method of cutting a tapered gear which comprises positioning a hob, having teeth arranged in a continuous thread, which are of uniform thickness measured lengthwise of the hob along a circular arc, and which have side cutting edges of varying pressure angle measured from one end of the hob to the other, so that said hob extends diagonally across the face of a tapered gear blank from the outer to the inner end of the tooth zone thereof, and rotating the hob and blank continuously in intermeshing engagement.

16. The method of cutting a tapered gear which comprises positioning a taper hob, having teeth arranged in a continuous thread, which are of uniform thickness measured lengthwise of the hob along a circular arc, and which have cutting edges of varying pressure angle from one end of the hob to the other, so that said hob extends diagonally across the face of a tapered gear blank from the outer to the inner end of the tooth zone thereof, and rotating the hob and blank continuously in intermeshing engagement.

17. The method of cutting a tapered gear which comprises positioning a taper hob, having teeth arranged in a continuous thread which are of increasing thickness measured from a point intermediate the length of the hob toward both ends of the hob, so that said hob extends diagonally across the face of a tapered gear blank from the outer to the inner end of the tooth zone thereof, and rotating the hob and blank continuously in intermeshing engagement.

18. The method of cutting a tapered gear which comprises positioning a hob having teeth arranged in a continuous thread of predetermined lead, which vary in thickness measured on a surface of revolution coaxial with the hob from the normal thickness of said teeth as determined by their position in the hob thread but which are of normal thickness measured on a circular arc, so that said hob extends diagonally across the face of a tapered gear blank from the outer to the inner end of the tooth zone thereof, and rotating the hob and blank continuously in intermeshing engagement.

19. The method of cutting a tapered gear which comprises positioning a taper hob, having teeth arranged in a continuous thread of a predetermined lead, which vary in thickness from normal thickness as determined by their position in the thread when measured along a cone element of the hob, and which are of normal thickness when measured on a circular arc, so that said hob extends diagonally across the face of a tapered gear blank from the outer to the inner end of the tooth zone thereof, and rotating the hob and blank continuously in intermeshing engagement.

20. The method of cutting a tapered gear which comprises positioning a hob, having its cutting teeth arranged in a continuous thread, said teeth, measured on a surface of revolution coaxial with the hob, being thinner intermediate the ends of the hob than at its ends, so that said hob extends diagonally across the face of a tapered gear blank from the outer to the inner end of the tooth zone thereof and rotating the hob and blank continuously in intermeshing engagement.

ERNEST C. HEAD.